(12) United States Patent
Ishigami

(10) Patent No.: US 7,314,319 B2
(45) Date of Patent: Jan. 1, 2008

(54) ELECTRICAL MODULE COVER, ELECTRICAL MODULE AND OPTICAL TRANSCEIVER

(75) Inventor: Yoshiaki Ishigami, Tokyo (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 11/118,375

(22) Filed: May 2, 2005

(65) Prior Publication Data

US 2006/0078260 A1 Apr. 13, 2006

(30) Foreign Application Priority Data

Oct. 7, 2004 (JP) ............................. 2004-295015

(51) Int. Cl.
*G02B 6/42* (2006.01)
*H04B 10/00* (2006.01)

(52) U.S. Cl. ..................... 385/92; 398/135; 398/138
(58) Field of Classification Search ............ 385/88–94; 398/135–139
See application file for complete search history.

(56) References Cited

U.S. PATENT DOCUMENTS

| 6,439,918 | B1 | 8/2002 | Togami et al. |
| 6,746,158 | B2 * | 6/2004 | Merrick ...................... 385/53 |
| 2002/0136501 | A1 * | 9/2002 | Yen et al. ...................... 385/88 |

* cited by examiner

*Primary Examiner*—Kevin S. Wood
(74) *Attorney, Agent, or Firm*—Foley & Lardner LLP

(57) ABSTRACT

An electrical module cover is fitted over a circuit substrate-accommodated chassis. The cover has a chassis-fitted opening into which is fitted the chassis, and a slit extending from the chassis-fitted opening to the opposite side.

11 Claims, 14 Drawing Sheets

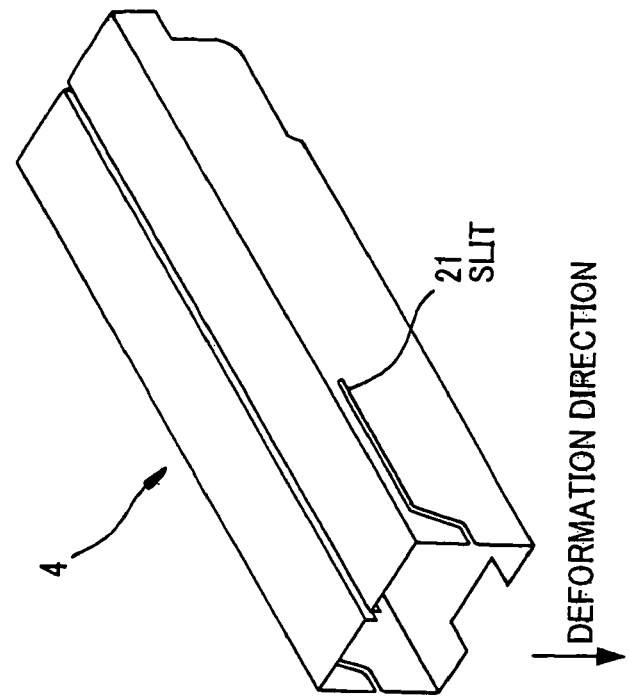
FIG. 11B
SHAPE BEFORE DEFORMATION
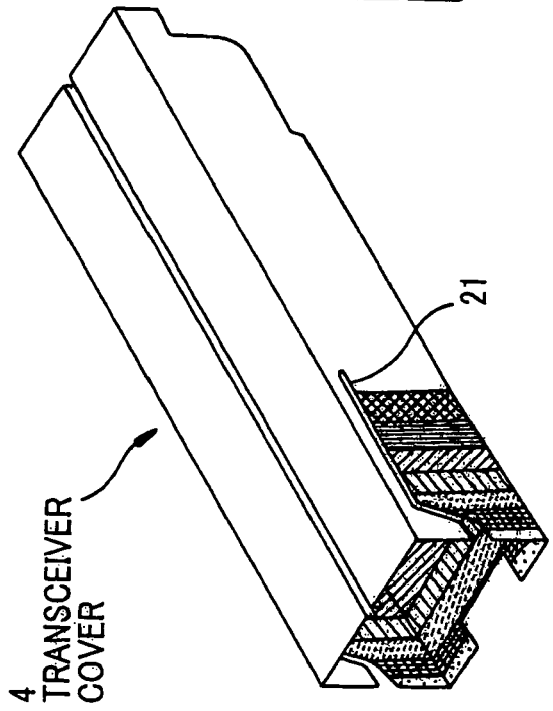
FIG. 11A
SHAPE AFTER DEFORMATION
 LARGE DEFORMATION
 SMALL DEFORMATION
NO DEFORMATION

ELECTRICAL MODULE COVER, ELECTRICAL MODULE AND OPTICAL TRANSCEIVER

The present application is based on Japanese patent application No. 2004-295015, the entire contents of which are incorporated herein by reference. Transceiver

BACKGROUND OF THE INVENTION

1. Field of the Invention

The present invention relates to an electrical module cover, an electrical module and an optical transceiver mounted in a cage of a host board (motherboard), and particularly, to its chassis structure.

2. Description of the Related Art

Pluggable optical transceivers which have become the main stream in recent years have, a tone end, insertable/removable optical connector cables having optical fibers that are transmission paths, and an optical transceiver (except for one end) is insertably/removably provided in a cage of a host board (motherboard) provided in an external device. This optical transceiver is used by mounting it in a cage of a motherboard.

As such an optical transceiver, an optical transceiver 121 as shown in FIGS. 1-3 comprises mainly a transceiver body 122, a transceiver chassis 123 in which is housed the transceiver body 122, and a metallic cover 124 fixed to the transceiver chassis 123. The transceiver body 122 has an optical transmitting/receiving module 126 fixed to a circuit substrate 125.

The optical transmitting/receiving module 126 is regulated in movement in directions other than a downward direction (−z direction), by the transceiver chassis 123, by fitting the optical transmitting/receiving module 126 into a holding portion 127 of the transceiver chassis 123. To regulate downward movement of the optical transmitting/receiving module 126, to the holding portion 127 is fixed a module holder 128 by engagement of engaging portions of a snap fastener or the like. The circuit substrate 125 is fixed to leg portions 129 of the transceiver chassis 123 by means of screws, respectively.

Using only the module holder 128 causes slight rattle in the engaging portions so that the optical transmitting/receiving module 126 cannot be firmly fixed to the transceiver chassis 123. The substantially cylindrical cover 124 is therefore used. This cover 124 is fixed to the transceiver chassis 123 by covering the transceiver chassis 123 with the cover 124 from the other end in the −x direction (by inserting the other end of the transceiver chassis 123 into the cover 124 in the +x direction).

In this case, the periphery of the transceiver chassis 123 except for its one end is covered with the cover 124, so that the optical transmitting/receiving module 126 is covered with the cover 124. Optical transceiver structure using such a cover 124 is common (see, e.g., U.S. Pat. No. 6,439,918).

In the optical transceiver 121, the height hc of the internal surface of the cover 124 is slightly greater than the height ht from the upper surface of the transceiver chassis 123 to the lowermost surface of the module holder 128 which holds the optical transmitting/receiving module 126 fitted into the holding portion 127 (hc>ht).

However, because of a slight difference between the height hc and ht, the optical transceiver 121 is difficult to be fabricated according to design, and in addition, because the cover 124 is metallic, it is difficult to be deformable.

For this reason, there is the problem that after the transceiver body 122 is housed, covering the transceiver chassis 123 with the cover 124 (inserting the transceiver chassis 123 into the cover 124) requires great force and is difficult, so that assembling is difficult. The optical transmitting/receiving module 126 can also be damaged.

On the other hand, if the height hc is too greater than the height ht, the optical transmitting/receiving module 126 cannot be firmly fixed by the transceiver chassis 123 and the cover 124, which may result in an optical-axis misalignment of the optical transmitting/receiving module 126. The above problems are also true of U.S. Pat. No. 6,439,918.

SUMMARY OF THE INVENTION

It is an object of the present invention to provide an electrical module cover that facilitates assembling an electrical module.

It is another object of the present invention to provide an electrical module and an optical transceiver that are easily assembled and allow electronic components such as an optical transmitting/receiving module, etc. to be securely fixed therein.

(1) According to one aspect of the invention, an electrical module cover, which is fitted over a circuit substrate-accommodated chassis, comprises:

a chassis-fitted opening into which is fitted the chassis; and a slit extending from the chassis-fitted opening to the opposite side.

(2) According to another aspect of the invention, an electrical module, which is mounted in a cage of a host board, comprises:

a chassis into which is fitted an electronic component; and a cover fixed to the chassis so as to cover the electronic component, wherein the cover is formed with a slit extending from its one end toward the other.

(3) According to another aspect of the invention, an optical transceiver, which is mounted in a cage of a host board, the optical transceiver comprises:

a transceiver chassis into which is fitted an optical transmitting/receiving module; and a cover fixed to the transceiver chassis so as to cover the optical transmitting/receiving module, wherein the cover is formed with a slit extending from its one end toward the other.

In the optical transceiver, it is preferred that the slit is formed so as to extend from the one end of the cover on a connector-inserted/removed opening side, toward the other end on a card edge portion side.

In the optical transceiver, it is preferred that when the cover is fixed to the transceiver chassis, the slit is formed so that the pushing force F acting on the cover is $0 < F \leq 490$ N.

In the optical transceiver, it is preferred that the slit is formed by avoiding the optical transmitting/receiving module and the space in which is mounted the optical transmitting/receiving module.

In the optical transceiver, it is preferred that the other end of the slit is formed in the longitudinal direction of the transceiver chassis.

In the optical transceiver, it is preferred that the width of the slit is narrower than the thickness of the other end of the transceiver chassis.

In the optical transceiver, it is preferred that the cover is formed of metal or resin.

In the optical transceiver, it is preferred that the height of the internal surface of the cover is equal to or lower than the height of a portion of the transceiver chassis into which is fitted the optical transmitting/receiving module.

In the optical transceiver, it is preferred that the difference d1 between the height of the portion of the transceiver chassis into which is fitted the optical transmitting/receiving module, and the height of the internal surface of the cover, is $0 \leq d1 \leq 0.5$ mm.

In the optical transceiver, it is preferred that the height of the portion of the transceiver chassis into which is fitted the optical transmitting/receiving module is the height from the upper surface of the transceiver chassis to the lowermost surface of the optical transmitting/receiving module fitted into the transceiver chassis, or is the height from the lower surface of the transceiver chassis to the uppermost surface of the optical transmitting/receiving module fitted into the transceiver chassis.

In the optical transceiver, it is preferred that a module holder which holds and fixes the optical transmitting/receiving module fitted into the transceiver chassis.

In the optical transceiver, it is preferred that the height of the internal surface of the cover is equal to or lower than the height of a portion of the transceiver chassis into which is fitted the optical transmitting/receiving module.

In the optical transceiver, it is preferred that the difference d2 between the height of a portion of the transceiver chassis to which is fitted the module holder, and the height of the internal surface of the cover, is $0 \leq d2 \leq 0.5$ mm.

In the optical transceiver, it is preferred that the height of the portion of the transceiver chassis to which is fitted the module holder is the height from the upper surface of the transceiver chassis to the lower surface of the module holder, or is the height from the lower surface of the transceiver chassis to the upper surface of the module holder.

In the optical transceiver, it is preferred that the leak electromagnetic wave level is below −100 dBm.

The present invention has the excellent effect of facilitating assembling an electrical module.

BRIEF DESCRIPTION OF THE DRAWINGS

The preferred embodiments according to the invention will be explained below referring to the drawings, wherein:

FIG. 11A is a perspective view illustrating a cover shape after deformation of the cover illustrated in FIG. 5;

FIG. 11B is a perspective view illustrating a cover shape before deformation of the cover illustrated in FIG. 5;

DETAILED DESCRIPTION OF THE PREFERRED EMBODIMENTS

Figure 4:
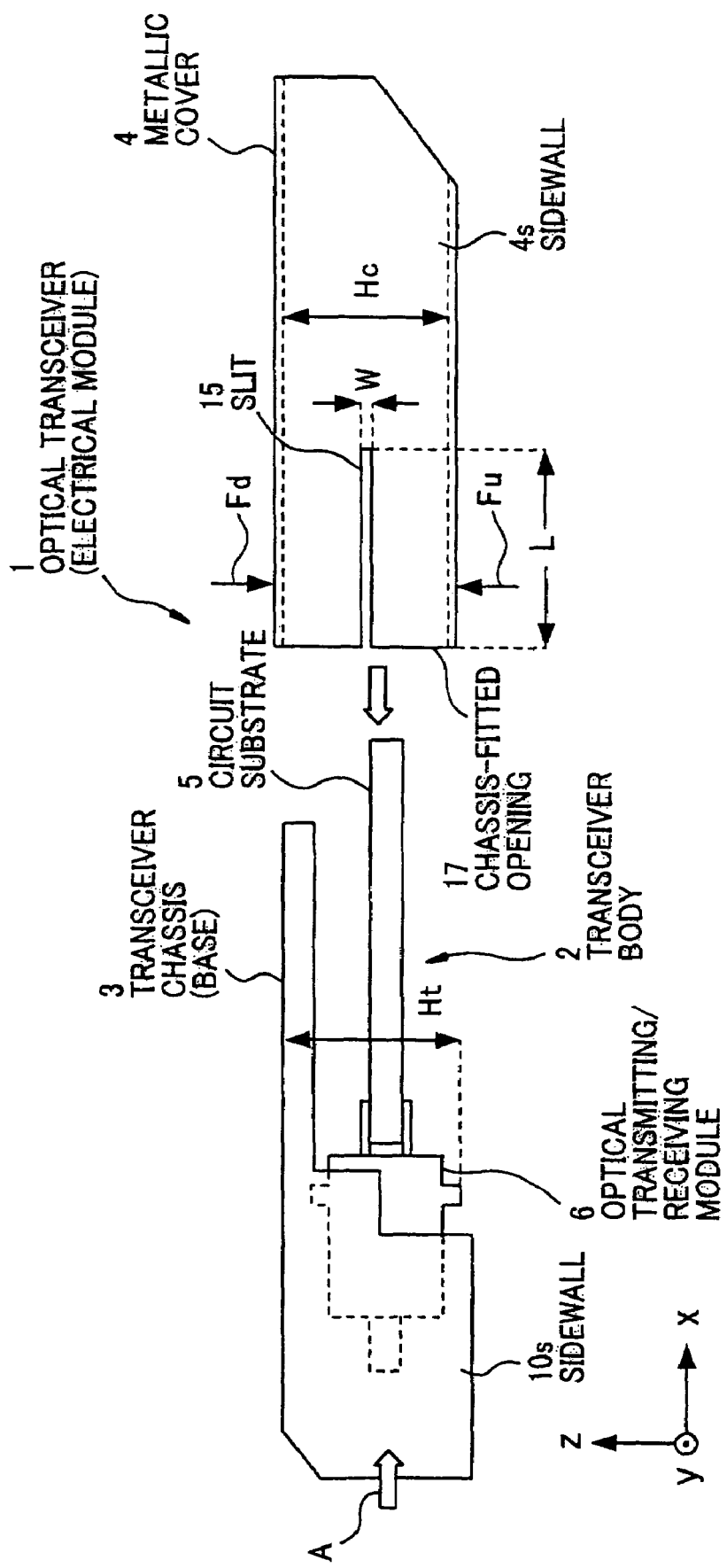
FIG. 4 is a schematic side view of an optical transceiver illustrating the first embodiment of the invention.
Figure 5:
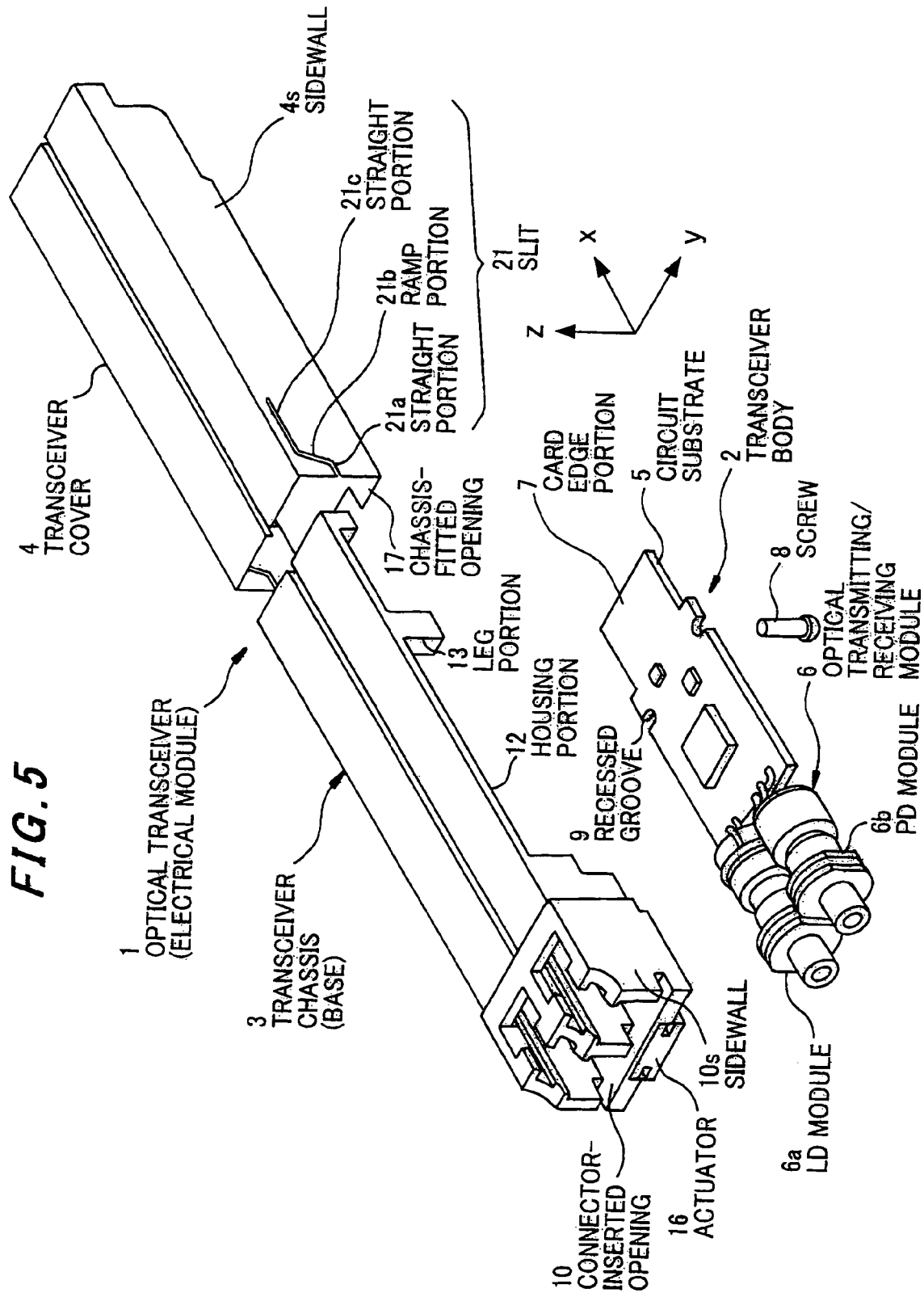
FIG. 5 is an exploded perspective view illustrating the details of the optical transceiver illustrated in FIG. 4.
Figure 6:
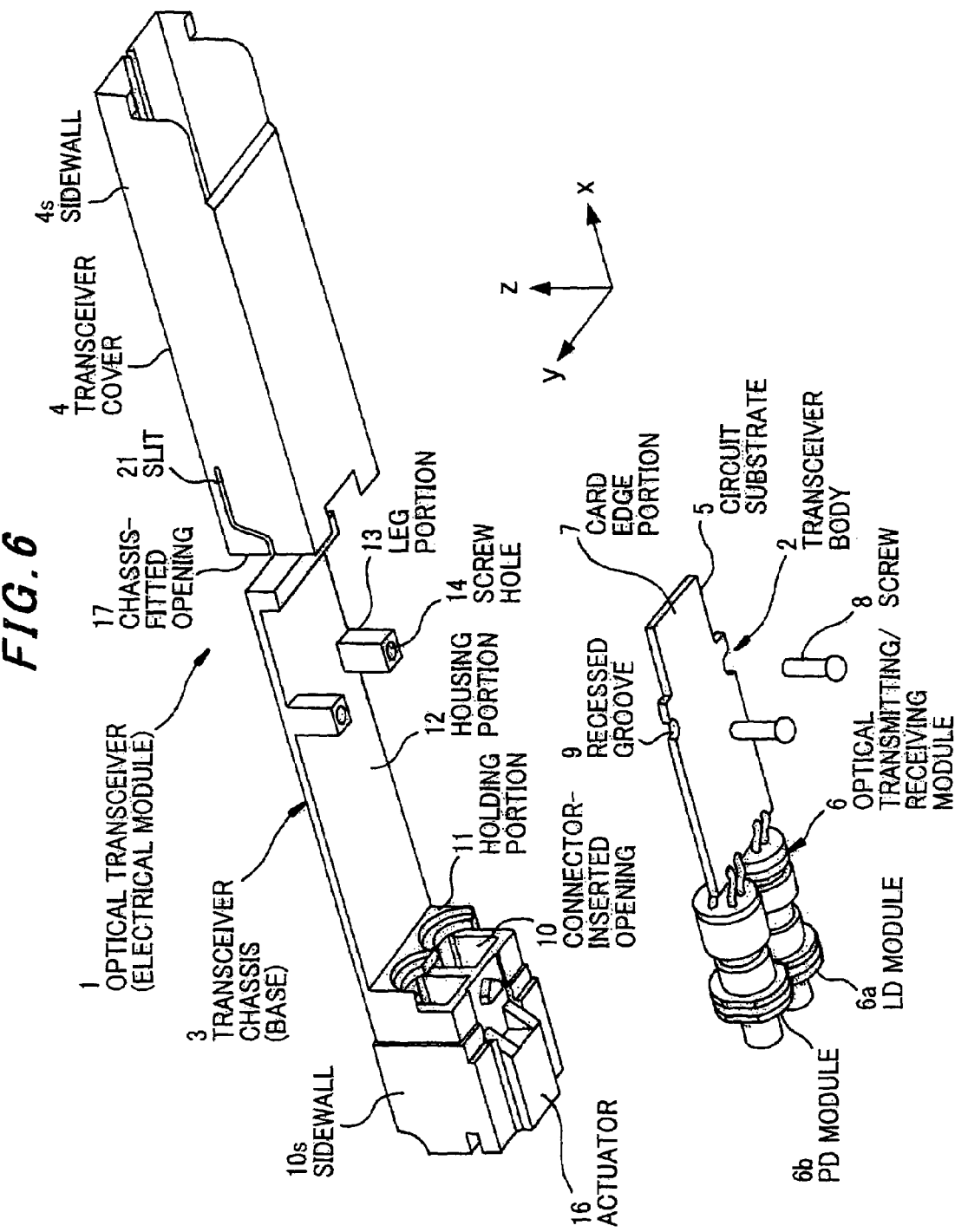
FIG. 6 is an exploded perspective view in the z-direction of FIG. 5.

FIG. 4 is a schematic side view of an optical transceiver illustrating the first preferred embodiment of the invention. FIG. 5 is a perspective view illustrating the details of the optical transceiver illustrated in FIG. 4. FIG. 6 is an exploded perspective view in the z-direction of FIG. 5.

Figure 1:
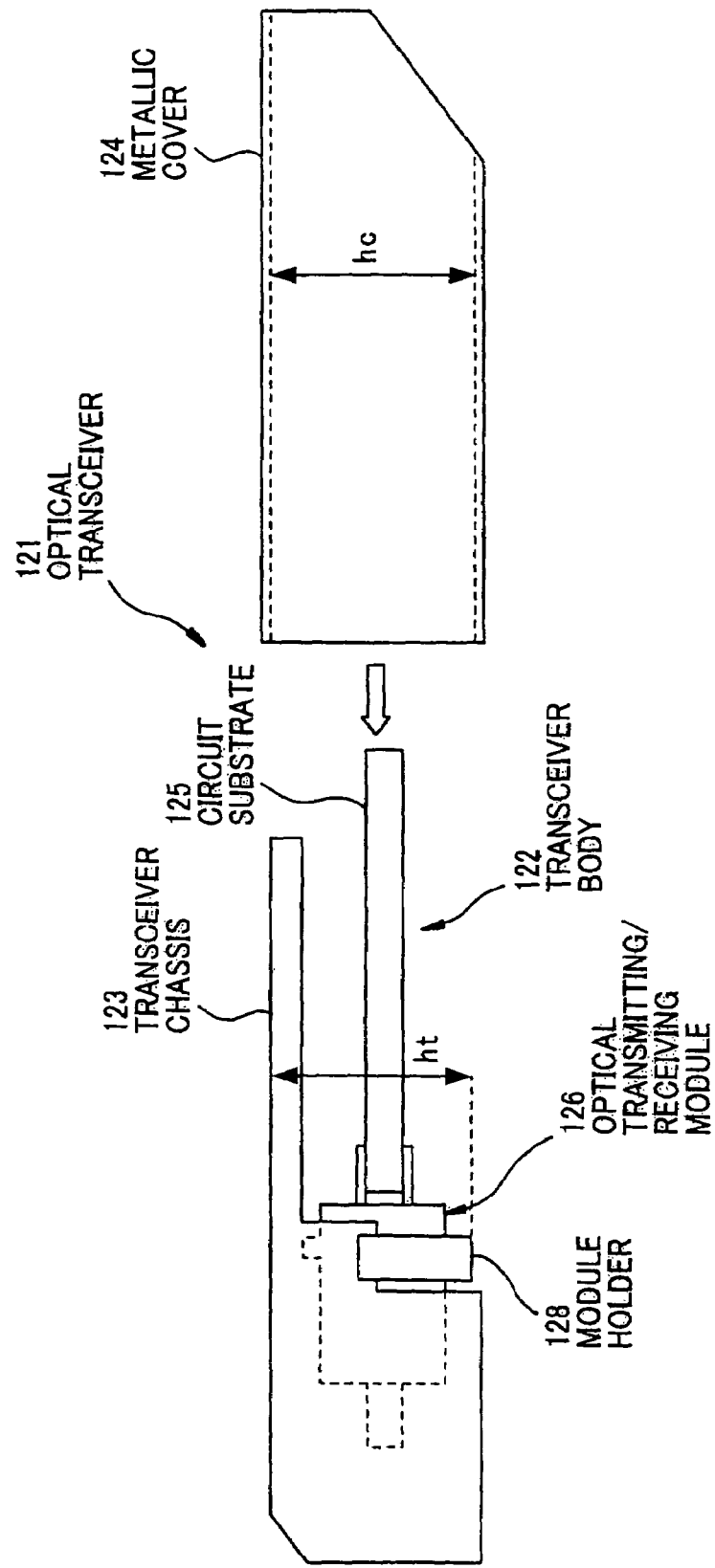
FIG. 1 is a schematic side view of a conventional optical transceiver.
Figure 2:
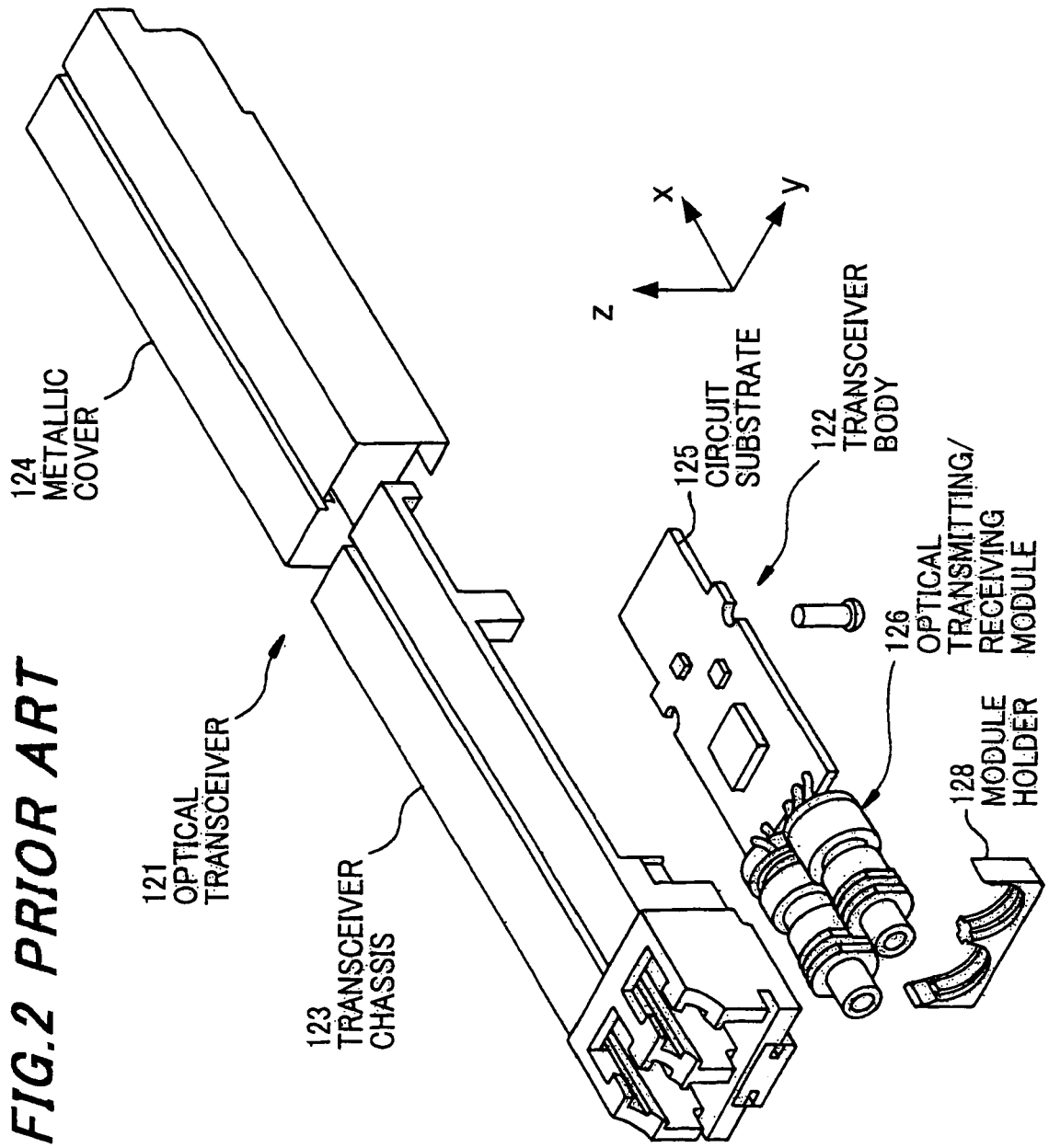
FIG. 2 is an exploded perspective view illustrating the details of the conventional optical transceiver of FIG. 1.
Figure 3:
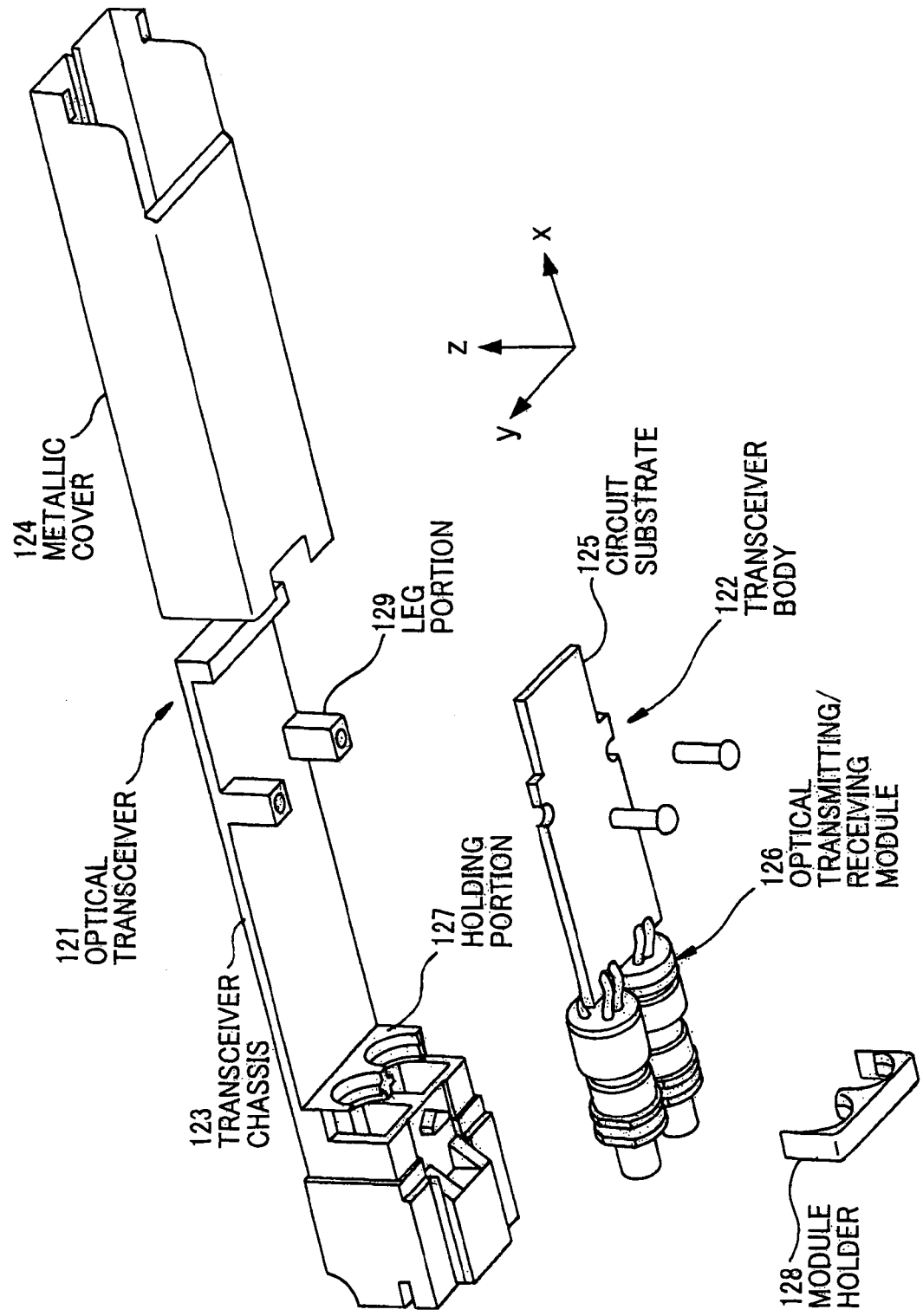
FIG. 3 is an exploded perspective view in the z-direction of FIG. 2.

As illustrated in FIGS. 4-6, an optical transceiver 1 as an electrical module concerned with the first embodiment is of the same pluggable type as the optical transceiver 121 explained in FIGS. 1-3, but is not limited thereto, and can likewise be applied to a (non-pluggable) optical transceiver fixed to and mounted on a host board.

The optical transceiver 1 comprises a transceiver body 2, a transceiver chassis (base) 3 in which is housed (accommodated) the transceiver body 2, and a transceiver cover 4 (as an electrical module cover) fixed to the transceiver chassis 3 and covering the whole of the transceiver body 2 (the transceiver cover 4 is fitted substantially over the whole of the transceiver chassis 3). The transceiver chassis 3 and cover 4 constitute an optical transceiver case (a chassis structure of optical transceiver 1).

The transceiver body 2 comprises a circuit substrate 5, where to its one end are soldered an LD (semiconductor laser) module 6a as an optical transmitting module for transmitting optical signals, and a PD (photodiode) module 6b as an optical receiving module for receiving optical signals. In this case, the heights of the lowermost surfaces of the LD module 6a and PD module 6b are the same where the lowermost surface is that of a portion having a maximum module radius. These LD module 6a and PD module 6b constitute an optical transmitting/receiving module 6 as an electronic component (an optical component).

The circuit substrate 5 has, at the other end, a card edge portion 7 which engages a card edge connector of a host board provided in an external device (not illustrated). The external device is exemplified by communication devices such as a switching hub, a media converter, etc. Although illustrated in detail, the card edge portion 7 is formed with a connection terminal for electrically connecting the circuit substrate 5 and the external device. The circuit substrate 5 has, on both sides of the other end, recessed grooves 9, respectively, which are also used for positioning the circuit substrate 5 to be fixed to the transceiver chassis 3 by means of two screws 8.

The circuit substrate 5 is formed with wiring patterns and terminals, and is equipped with electronic components such as a control IC for controlling signals transmitted/received by the LD module 6a and PD module 6b, an LD driver for driving an LD provided in the LD module 6a.

The transceiver chassis 3 is formed in a lump, for example, by die-casting a high heat-dissipative metal such as Zn, Al, etc. The transceiver chassis 3 may also be formed by cutting a high heat-dissipative metal such as Zn, Al, etc.

The transceiver chassis 3 has an open lower portion at the other end so that it is formed substantially in an inverted-L shape when viewed from its side. The transceiver chassis 3 has, at one end, two parallel connector-inserted/removed openings 10 for providing insertable/removable optical connector cables (not illustrated) having optical fibers that are transmission paths. The connector-inserted/removed openings 10 have in a lower portion an actuator 16 (see FIGS. 5 and 6) for pulling the optical transceiver 1 out of the external device.

The transceiver chassis 3 has, in an internal upper surface at the other end of the connector-inserted/removed openings 10, a holding portion 11 for the LD module 6a and PD module 6b to be fitted and held therein. The holding portion 11 may be a different component from that of the transceiver chassis 3, and this different component may be formed of resin, metal, etc.

The transceiver chassis 3 has, at the other end, a substantially plate-shaped housing portion 12 for housing the transceiver body 2. The housing portion 12 has, in an internal upper surface at the other end, leg portions 13 for mounting the circuit substrate 5, and the leg portions 13 are respectively formed with screw holes 14 for the screws 8 to be screwed therein through the recessed grooves 9 of the circuit substrate 5.

The cover 4 is substantially cylindrically formed of a high heat-dissipative metal such as SUS, Zn, Al, etc., or resin. The cover 4 has, at one end, a chassis-fitted opening 17 for the transceiver chassis 3 to be fitted therein. Taking into account pressing machinability and strength, this embodiment uses the cover 4 of SUS material. The metallic cover 4 is obtained by molding it after pressing.

The cover 4 has an open lower portion at the other end. The cover 4 has in both sidewalls 4s slits (side slits) 15, respectively, which extend straight from one end toward the other substantially in a middle portion of the height of the cover 4 (see FIG. 4).

More specifically, when the cover 4 is fixed to the transceiver chassis 3, slits 15 are formed so as to extend, from one end (chassis-fitted opening 17) of the cover 4 at the other end of the connector-inserted/removed openings 10 of the transceiver chassis 3, toward the other end (the inward opposite side of chassis-fitted opening 17) of the cover 4 on the card edge portion 7 side of the transceiver body 2.

When the cover 4 is fixed to the transceiver chassis 3 in which is housed the transceiver body 2, the internal upper surface of the cover 4 contacts the upper surface (except for one end) of the transceiver chassis 3, while the internal lower surface of the cover 4 contacts the lowermost surface of the optical transmitting/receiving module 6.

The height Hc of the internal surface of the cover 4 may be made equal to or slightly lower than the height Ht of a portion of the transceiver chassis 3 into which is fitted the optical transmitting/receiving module 6 (Hc<Ht).

In the optical transceiver 1, the height Ht of a portion of the transceiver chassis 3 into which is fitted the optical transmitting/receiving module 6 is the height Ht from the upper surface of the transceiver chassis 3 to the lowermost surface of the optical transmitting/receiving module 6 fitted into the holding portion 11. More specifically, the difference between the height Ht and Hc, d1(=Ht−Hc) is $0 \leq d1 \leq 0.5$ mm.

In determining the shape of the slit 15, there are the two following conditions to be satisfied. First, (1) the internal height of one end of the cover 4 is made deformable by Ht−Hc.

In addition, (2) the optical coupling/separation of the optical connector cable and the optical transmitting/receiving module 6 must not be inhibited by movement of the optical transmitting/receiving module 6 due to force acting thereon when the optical connector cable is inserted into or removed from the connector-inserted opening 10. For that reason, the upward/downward elastic force of the cover 4 generated by the slit 15 has to be strong so as to be able to firmly fix the optical transmitting/receiving module 6.

More specifically, when the cover 4 is fixed to the transceiver chassis 3, the slit 15 is formed so that the upward and downward pushing forces Fu and Fd acting on the cover 4 are respectively $0 < Fu$ and $Fd \leq 490$ N ($0 < Fu$ and $Fd \leq 50$ kgf). More preferably, in order to sufficiently fix the optical transmitting/receiving module 6, it is desirable that Fu, $Fd \geq 19.6$ N (2 kgf).

Figure 7:
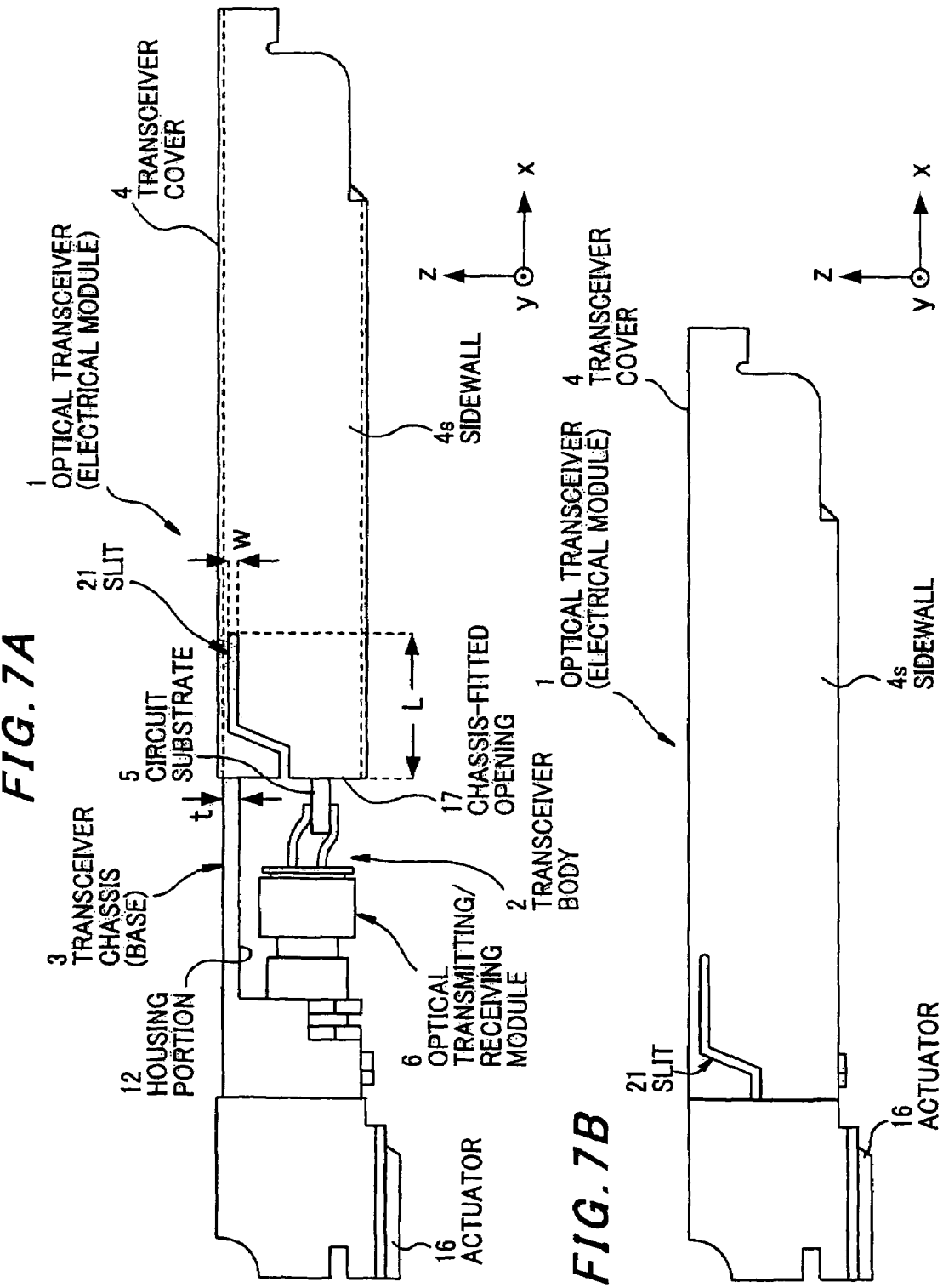
FIG. 7A is a side view where a cover is fixed to a transceiver chassis.
FIG. 7B is a side view of the optical transceiver illustrated in FIG. 5.

As the slit, as illustrated in FIGS. 5, 6 and 7A, when the cover 4 is fixed to the transceiver chassis 3, a slit 21 may be used which is formed in a line-graph shape, avoiding the optical transmitting/receiving module 6 and the space in which is mounted the optical transmitting/receiving module 6, in other words, avoiding the portion of the optical transmitting/receiving module 6 covered with the cover 4.

More specifically, the other end of the slit 21 is formed in the longitudinal direction of the transceiver chassis 3. In addition, the width w of the slit 21 is made narrower than the thickness t of the housing portion 12 (t>w). This slit 21 comprises a straight portion 21a extending from one end toward the other substantially in a middle portion of the height of the cover 4, a ramp portion 21b extending from the other end of the straight portion 21a in a right upward diagonal direction of the cover 4, and a straight portion 21c as the other end of the slit 21 extending from the other end of the ramp portion 21b toward the other end of the cover 4.

In this manner, by forming the slit 21, when the cover 4 is fixed to the transceiver chassis 3, the optical transmitting/receiving module 6 cannot be seen from the slit 21 (becomes unexposed to the outside of the optical transceiver 1). In other words, the cut portion of the transceiver chassis 3 cannot be seen from the slit 21.

Figure 9:
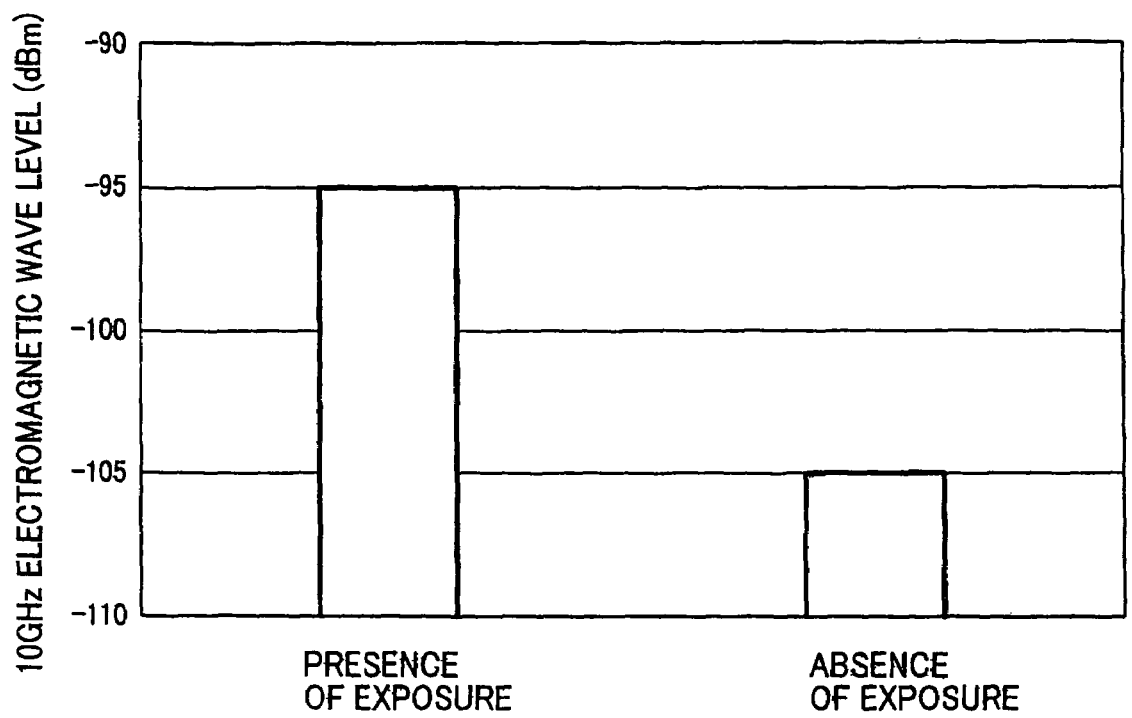
FIG. 9 is a diagram showing 10 GHz-electromagnetic wave levels in the cases of the presence and absence of exposure of an optical transmitting/receiving module.

This can reduce electromagnetic waves emitted to the outside of the optical transceiver 1 from the slit 21, which has no adverse effect on another device. As illustrated in FIG. 9, comparing, for example, leak electromagnetic wave levels of 10 GHz-transmission signals, it is found that when the optical transmitting/receiving module 6 can be seen from the slit 21 (in the presence of exposure of the optical transmitting/receiving module 6), it is −95 dBm, whereas when the optical transmitting/receiving module 6 cannot be seen from the slit 21 (in the absence of exposure of the optical transmitting/receiving module 6), it is −105 dBm which is a substantial enhancement in characteristics.

Here, the present inventor examines, in more detail, width w and length L of the slit 21 which satisfy the above-mentioned conditions (1) and (2). The following explanation is likewise applied to the slit 15.

The material of the cover 4 is SUS. Taking account of metal-pressing ability, the slit width w is 0.5 mm, and the thickness of the cover 4 is 0.2 mm. Both dimensions are common, which cause no inconvenience in machining. Also, taking account of machining accuracy (approximately 10 μm) of the transceiver chassis 3 and metal-pressing accuracy (approximately 10 μm) of the cover 4, Ht−Hc=100 μm as the machinable dimension.

Figure 10:
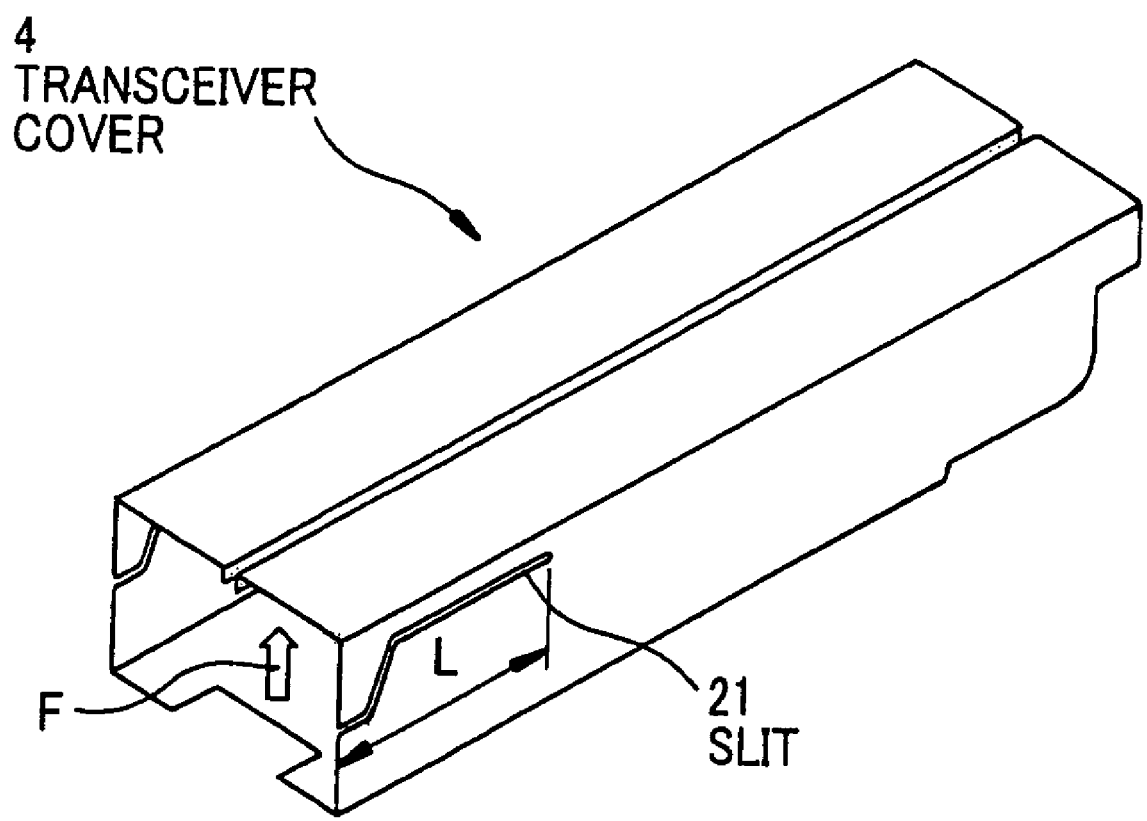
FIG. 10 is a perspective view of the cover illustrated in FIG. 5.

Subsequently, when Ht−Hc=100 μm, as shown in FIG. 10, the upward pushing force F generated in the cover 4 is calculated by the finite element method. It should be noted that the deformation direction of the cover 4 is downward, as shown in FIG. 11.

Figure 12:
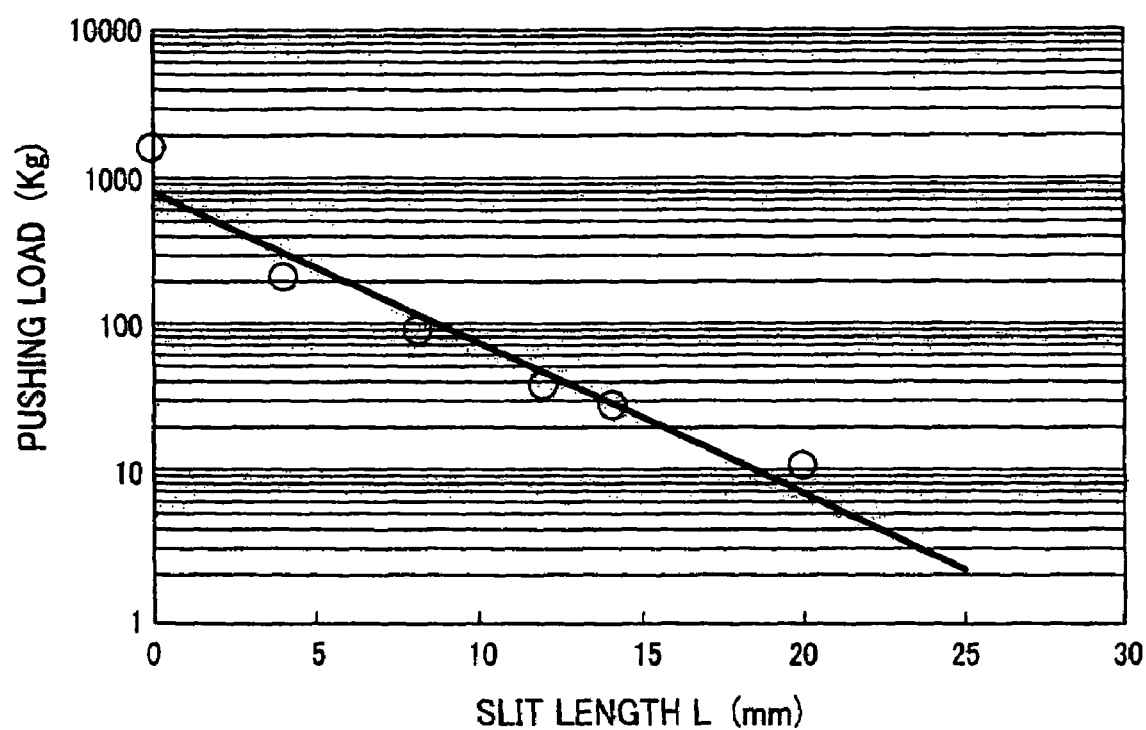
FIG. 12 is a diagram showing the relationship between slit length L and force required for deforming the cover by 100 μm.

FIG. 11A illustrates the shape after deformation of the cover 4 in this case. Also, FIG. 12 shows the relationship between slit length L and force (pushing load (kg)) required for deforming the cover 4 by 100 μm. In FIG. 12, the circles represent calculated values, and the line represents an exponential approximation curve of the calculated value group.

The cover 4 before deformation in FIG. 11B is deformed downward by 100 μm in a lower portion of the slit 21, so that its deformation gradually becomes larger from one end of the cover 4 toward the other in the lower portion of the slit 21, as illustrated in FIG. 11A.

As shown in FIG. 12, when the slit length L is 0, i.e. in the absence of the slit 21, deforming the cover 4 by 100 μm requires 1000 kg-pushing load, which results in destruction of parts.

In contrast, when the slit length L is greater than 12 mm, deforming the cover 4 by 100 μm requires less than 50 kg-pushing load, which satisfies $0<Fu$ and $Fd \leq 490$ N mentioned above. And, when the slit length L is 19 mm, deforming the cover 4 by 100 μm requires the order of 10 kg-pushing load, which causes no destruction of parts and is therefore preferable pushing force.

In other words, at the slit length L=19 mm, the pushing force F is 98 N (10 kgf), which is sufficient to push the optical transmitting/receiving module, and is not tight when the transceiver chassis 3 (see FIG. 4) is covered with the cover 4 (the transceiver chassis 3 is inserted into the cover 4). It is therefore desirable the slit length L is on the order of 19 mm. Also, in order to ensure greater than 2 kg-pushing load of the cover 4, it is preferred that the slit length L is less than 25 mm of the length of the cover 4.

Further, "100 μm" is the deformable amount required from difficulty in mounting the cover 4 on the transceiver chassis 3 unless the cover 4 is deformed by the order of 100 μm during its mounting.

Assembling (mounting) procedure of the optical transceiver 1 is explained next.

First, the optical transmitting/receiving module 6 fixed to the circuit substrate 5 is fitted into the holding portion 11 of the transceiver chassis 3, while the circuit substrate 5 is mounted on the leg portions 13 of the transceiver chassis 3, and fixed thereto by screwing the screws 8 through the recessed grooves 9 into the screw holes 14 of the leg portions 13, so that the transceiver body 2 is housed in the housing portion 12 of the transceiver chassis 3.

Figure 8:
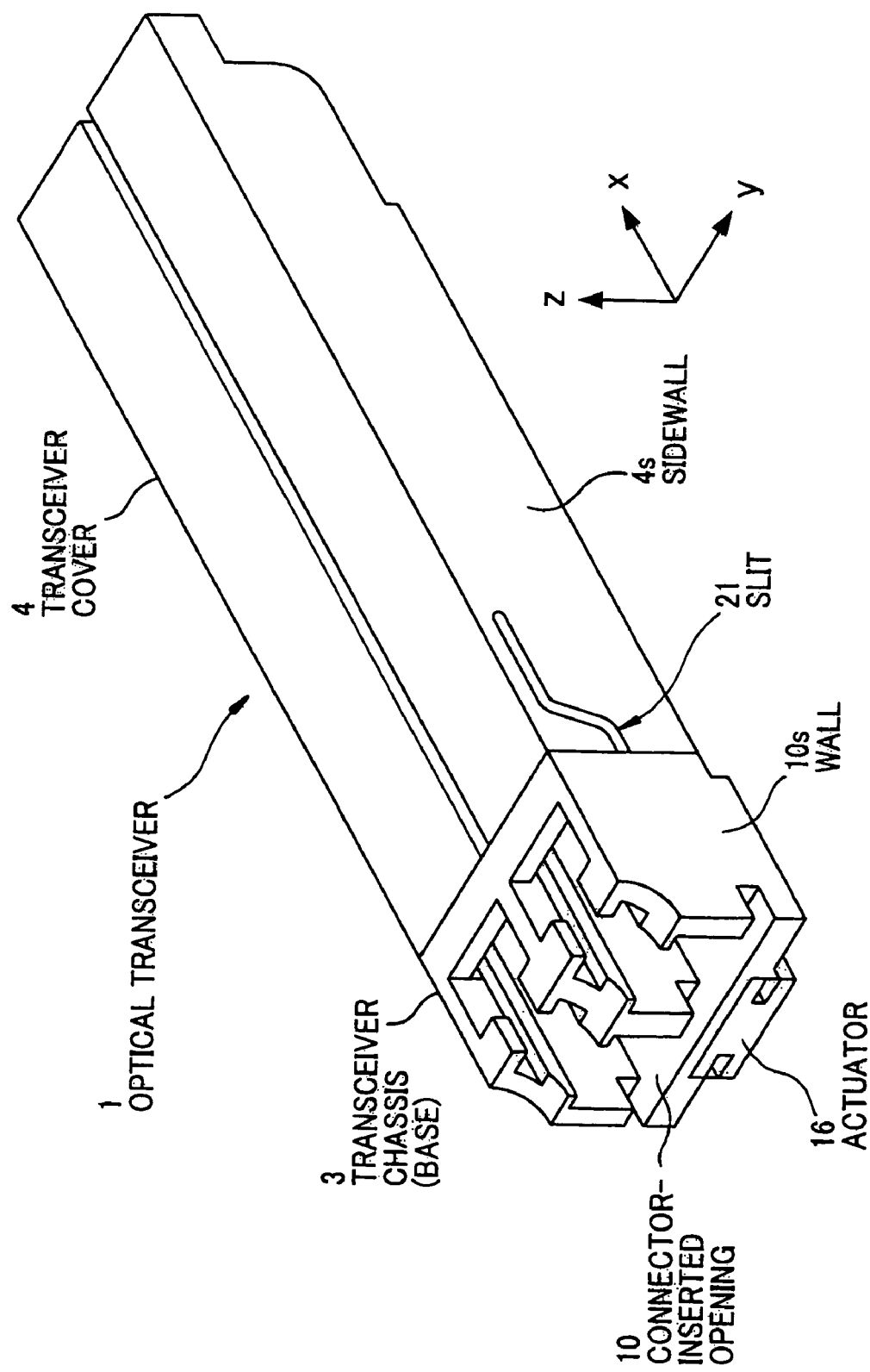
FIG. 8 is a perspective view of the optical transceiver illustrated in FIG. 5.

Subsequently, as illustrated in FIGS. 4 and 7A, by covering the transceiver chassis 3 with the cover 4 from the other end in the −x direction (by inserting the other end of the transceiver chassis 3 into the cover 4 in the +x direction), and fixing the cover 4 to the transceiver chassis 3, a substantially rectangular-parallelepiped optical transceiver 1 which is narrowed in width and elongated is obtained, as illustrated in FIGS. 7B and 8.

In this case, the periphery of the transceiver chassis 3 except for its one end (the periphery of the connector-inserted opening 10) is covered with the cover 4, so that the optical transmitting/receiving module 6 is covered with the cover 4. Although illustrated in detail, the backside of the card edge portion 7 (see FIGS. 5 and 6) of the circuit substrate 5 is exposed at the other end of the cover 4.

In the optical transceiver 1, by inserting the card edge portion 7 of the circuit substrate 5 into a front panel of an external device in the +x direction, the circuit substrate 5 is electrically connected to a host board within the external device, and by connecting the optical connector cable inserted into the connector-inserted opening 10 in the +x direction (the arrow A direction in FIG. 4) to one end of the optical transmitting/receiving module 6, the optical transmitting/receiving module 6 is optically coupled to the transmission paths.

Effects of the first embodiment are explained.

In the optical transceiver 1, by forming in both sidewalls 4s of the metallic cover 4 the slits 15 extending from one end of the cover 4 toward the other, the cover 4 is caused to have spring properties, so that the cover 4 tends to be deformed upwardly and downwardly.

After the transceiver body 2 is housed, this allows the transceiver chassis 3 to be easily covered with (or inserted into) the cover 4 with a smaller force than that of the conventional optical transceiver 121 of FIG. 1, which facilitates assembling. Also, during assembling, the optical transmitting/receiving module 6 can be prevented from being damaged. In short, the cover 4 facilitates the assembling of the optical transceiver 1.

In addition, when the cover 4 is fixed to the transceiver chassis 3, since the upward and downward pushing forces (elastic forces) Fu and Fd act on the cover 4, the lowermost surface of the optical transmitting/receiving module 6 is pushed upward by the internal lower surface of the cover 4, which allows the optical transmitting/receiving module 6 to be firmly fixed by the transceiver chassis 3 and the cover 4, and can also prevent the optical-axis misalignment of the optical transmitting/receiving module 6.

In particular, by making the height Hc of the internal surface of the cover 4 lower than the height Ht from the upper surface of the transceiver chassis 3 to the lowermost surface of the optical transmitting/receiving module 6 fitted into the holding portion 11, the elastic forces Fu and Fd are increased, which consequently allows the optical transmitting/receiving module 6 to be more securely fixed. In this case, making Hc<Ht requires no strict accuracy compared to the conventional optical transceiver 121, which therefore also facilitates the fabrication of the cover 4.

Also, when the cover 4 is fixed to the transceiver chassis 3, by using, instead of the straight slit 15, the slit 21 formed in a line-graph shape avoiding the space in which is mounted the optical transmitting/receiving module 6, the optical transmitting/receiving module 6 becomes unexposed from the slit 21, which can therefore prevent the leak of electromagnetic waves to the outside of the cover 4, and the invasion of electromagnetic waves into the cover 4, and reduce noise.

The second embodiment is explained next.

Figure 13:
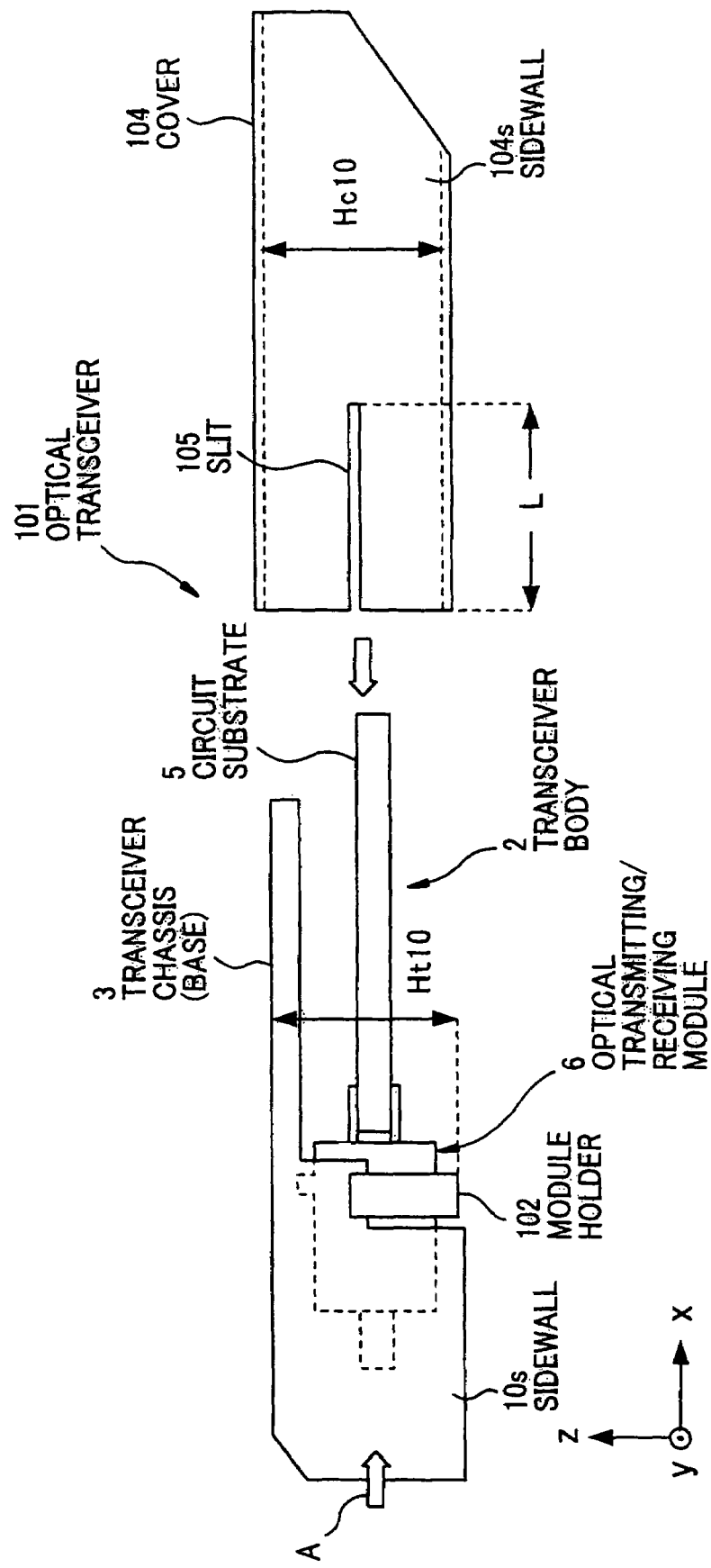
FIG. 13 is a schematic side view of an optical transceiver illustrating the second embodiment of the invention.

As illustrated in FIG. 13, an the optical transceiver 101, in addition to the conFIGuration of the transceiver chassis 3, has a module holder 102 which holds and fixes the optical transmitting/receiving module 6 fitted into the transceiver chassis 3, and it uses a cover 104 whose internal surface height is different from that of the cover 4 of FIG. 4.

The module holder 102 is similar to the module holder 128 explained in FIGS. 1-3, and has a recessed portion (or a protruded portion) at both ends of its upper surface as an engagement portion with the holding portion 11 (see FIG. 6) of the transceiver chassis 3. The module holder 102 is substantially in the same shape as the holding portion 11, and is formed of resin, for example.

Similarly, the holding portion 11 has a protruded portion (or a recessed portion) at both ends of its lower surface as an engagement portion with the module holder 102. After the transceiver body 2 is housed in the transceiver chassis 3, the module holder 102 is fixed to the holding portion 11 of the transceiver chassis 3 by engaging the engagement portions of each other.

Here, merits of using the module holder 102 are explained. In the prior art, since the transceiver chassis is fabricated in a lump by die-casting, the slight design modification of the chassis structure requires mold fabrication cost of die-casting.

In contrast, in the module holder 102, since the receiving portion of the optical transmitting/receiving module 6 to be modified in design is formed in a block, the dimension modification of the optical transmitting/receiving module 6 can be made by the dimension modification of the module holder 102, which obviates the need of the design modification of the transceiver chassis 3. Since the module holder 102 structure is simple and small compared to the whole of the transceiver chassis 3, even if the module holder 102 is fabricated by metal die-casting, mold fabrication can be low-cost.

Also, the module holder 102 can be molded from resin because of no need to serve as electromagnetic shielding. In general, the mold fabrication of resin is low-cost compared to that of die-casting, which therefore makes the mold fabrication of the module holder 102 lower-cost. Thus, the dimension modification of the optical transmitting/receiving module 6 has the effect of saving the cost of parts.

When the cover 104 is fixed to the transceiver chassis 3 in which is housed the transceiver body 2, the internal upper surface of the cover 104 contacts the upper surface (except for one end) of the transceiver chassis 3, while the internal lower surface of the cover 104 contacts the lower surface of the module holder 102.

The cover 104 has in both sidewalls 104s slits 105, respectively, similar to the slits 15 of FIG. 4.

The height Hc10 of the internal surface of the cover 4 may be made equal to or slightly lower than the height Ht10 of a portion of the transceiver chassis 3 into which is fitted the module holder 102 (Hc10<Ht10).

In the optical transceiver 101, the height Ht10 of a portion of the transceiver chassis 3 into which is fitted the module holder 102 is the height Ht10 from the upper surface of the transceiver chassis 3 to the lower surface of the module holder 102 fixed to the holding portion 11. More specifically, the difference between the height Ht10 and Hc10, d2 (=Ht10−Hc10) is 0≦d2≦0.5 mm.

In the optical transceiver 101, after the transceiver body 2 is housed, by fixing the cover 104 to the transceiver chassis 3, the lower surface of the module holder 102 is pushed upward by the internal lower surface of the cover 104.

This optical transceiver 101 has the same effects as those of the optical transceiver 1 of FIG. 4. Also, when the cover 4 is fixed to the transceiver chassis 3, instead of the straight slit 105, a slit similar to the slit 21 of FIG. 5 formed in a line-graph shape avoiding the space in which is mounted the optical transmitting/receiving module 6 may be used.

The third embodiment is explained next.

Figure 14:
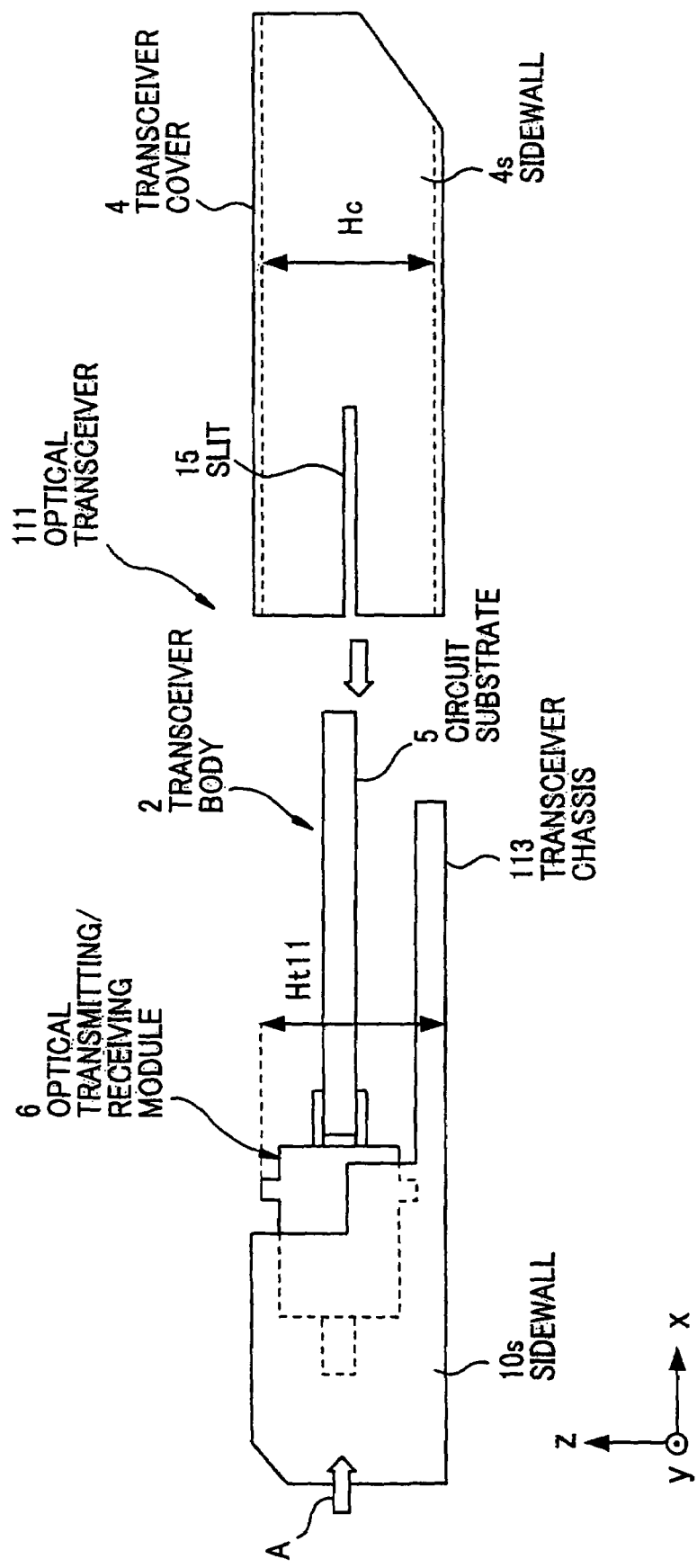
FIG. 14 is a schematic side view of an optical transceiver illustrating the third embodiment of the invention.

As illustrated in FIG. 14, an the optical transceiver 111 uses a transceiver chassis 113 whose shape is different from that of the transceiver chassis 3 of FIG. 4. The transceiver chassis 113 has an open upper portion at the other end so that it is formed substantially in an L shape when viewed from its side.

The height Hc of the internal surface of the cover 4 may be made equal to or slightly lower than the height Ht11 of a portion of the transceiver chassis 113 into which is fitted the optical transmitting/receiving module 6 (Hc<Ht11).

In the optical transceiver 111, the height Ht11 of a portion of the transceiver chassis 113 into which is fitted the optical transmitting/receiving module 6 is the height Ht11 from the lower surface of the transceiver chassis 113 to the uppermost surface of the optical transmitting/receiving module 6 fitted into the transceiver chassis 113. More specifically, the difference between the height Ht11 and Hc, d1 (=Ht11−Hc) is 0≦d1≦0.5 mm.

This optical transceiver 111 also has the same effects as those of the optical transceiver 1 of FIG. 4.

Also, as a modified example of the optical transceiver 111, in the same manner as the optical transceiver 101, an optical transceiver, in addition to the conFIGuration of the transceiver chassis 113, may have a module holder which holds and fixes the optical transmitting/receiving module 6 fitted into the transceiver chassis 113. In this case, the height of the internal surface of the cover may be made equal to or slightly lower than the height from the lower surface of the transceiver chassis 113 to the upper surface of the module holder.

While the above embodiments have been explained by way of the examples where the slits 15 and 21 are formed in the sidewalls of the cover, slits similar thereto may be formed in the upper surface and/or the lower surface of the cover.

While the above embodiments have been explained with the optical transceiver 1 exemplifying the electrical module, the electrical module is not limited to the optical transceiver 1, but may be any electrical module that has a cover which is fitted over a chassis in which is housed a circuit substrate.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An optical transceiver, which is mounted in a cage of a host board, the optical transceiver comprising:
    a transceiver chassis into which is fitted an optical transmitting/receiving module; and
    a cover fixed to the transceiver chassis so as to cover the optical transmitting/receiving module,
    wherein the cover is formed with a pair of slits in respective sides of the cover, each slit being formed so as to extend from one end of the cover on a connector-inserted/removed opening side toward an other end on a card edge portion side, and
    wherein the cover has an internal surface height lower than a height of the transceiver chassis at a portion covered by the cover, and the height of the transceiver chassis at the portion covered by the cover is a height from an upper surface of the transceiver chassis to a lowermost surface of the optical transmitting/receiving module fitted into the transceiver chassis, or is a height from a lower surface of the transceiver chassis to an uppermost surface of the optical transmitting/receiving module fitted into the transceiver chassis.

2. The optical transceiver according to claim 1, wherein:
    when the cover is fixed to the transceiver chassis, at least one of the slits is formed so that a pushing force F generated in the cover is 0<F≦490 N.

3. The optical transceiver according to claim 1, wherein:
    at least one of the slits is formed by avoiding the optical transmitting/receiving module and a space in which is mounted the optical transmitting/receiving module.

4. The optical transceiver according to claim 3, wherein: at least one of the slits has an end formed in a longitudinal direction of the transceiver chassis.

5. The optical transceiver according to claim 3, wherein: at least one of the slits has a width narrower than a thickness of an end of the transceiver chassis.

6. The optical transceiver according to claim 1, wherein: the cover is made of metal or resin.

7. The optical transceiver according to claim 1, wherein: a difference d1 between the height of the transceiver chassis at the portion covered with the cover, and the height of an internal surface of the cover, is $0<d1\leq0.5$ mm.

8. The optical transceiver according to claim 1, further comprising:
a module holder which holds and fixes the optical transmitting/receiving module fitted into the transceiver chassis.

9. The optical transceiver according to claim 8, wherein: a difference d2 between a height of a portion of the transceiver chassis to which is fitted the module holder, and the height of an internal surface of the cover, is $0\leq d2\leq0.5$ mm.

10. The optical transceiver according to claim 8, wherein:
a height of a portion of the transceiver chassis to which is fitted the module holder is a height from an upper surface of the transceiver chassis to a lower surface of the module holder, or is a height from a lower surface of the transceiver chassis to an upper surface of the module holder.

11. The optical transceiver according to claim 1, wherein:
the optical transceiver has a leak electromagnetic wave level of below −100 dBm.

* * * * *